United States Patent [19]

Karabin et al.

[11] Patent Number: 5,082,172
[45] Date of Patent: Jan. 21, 1992

[54] THERMALLY ACTIVATED VENT DAMPER

[75] Inventors: Tadeusz Karabin, Huntington; Frank H. Broome, Fort Wayne, both of Ind.

[73] Assignee: Majco Building Specialties, L.P., Huntington, Ind.

[21] Appl. No.: 550,380

[22] Filed: Jul. 10, 1990

[51] Int. Cl.[5] ............................................. G05D 23/08
[52] U.S. Cl. ................................. 236/1 G; 236/93 R; 236/101 D; 248/597
[58] Field of Search ................ 236/1 G, 93 R, 101 B, 236/101 D; 137/512.5, 512.1; 248/597

[56] References Cited

U.S. PATENT DOCUMENTS

| | | | |
|---|---|---|---|
| 2,975,975 | 3/1961 | Weber | 236/93 R X |
| 3,273,798 | 9/1966 | Kuiper | 236/93 R |
| 3,366,333 | 1/1968 | Diehl | 236/93 R |
| 4,283,006 | 8/1981 | Fedevoltz | 236/1 G |
| 4,361,272 | 11/1982 | Prikkel, III et al. | 236/1 G |
| 4,587,706 | 5/1986 | Prikkel, III et al. | 236/1 G X |

FOREIGN PATENT DOCUMENTS

209039 5/1960 Fed. Rep. of Germany .... 236/93 R

Primary Examiner—William E. Tapolcai
Attorney, Agent, or Firm—Hoffmann & Baron

[57] ABSTRACT

A thermally activated vent damper assembly for a flue is adapted to be situated in relation to the flue for occluding the passage of gas through the flue. A support member transverses the flue and suspends the damper member across the flue for movement between an open and a closed position. A thermally activated biasing member is operatively coupled between the support member and the damper member to bias the damper member in the open position in the presence of heat and to bias the damper member in the closed position in the absence of heat. The coupling of the biasing member between the support member and the damper member is such that potential sites for frictional inhibition of damper member movement are eliminated. Upon breakage or other failure of the biasing member to apply bias, the damper member defaults to or remains in an open position under the force of gravity, providing for a unique fail-safe feature.

5 Claims, 5 Drawing Sheets

THERMALLY ACTIVATED VENT DAMPER

BACKGROUND OF THE INVENTION

1. Field Of The Invention

The present invention relates to vent dampers for heating apparatus such as fireplaces, wood stoves, water heaters and gas-fired furnaces. More particularly, the present invention relates to thermally activated vent dampers which automatically open and close in the presence or absence of heat.

2. Description Of The Prior Art

It has been known in conventional heating apparatus designs to incorporate thermally activated vent dampers above the combustion chamber either within the flue or at a point where the flue and the combustion chamber intersect. During periods where there is no heat produced in the combustion chamber, such dampers will remain closed to prevent heat loss from the internal room environment due to convection currents directed up the flue. It is also well known in the art that for a thermally activated vent damper to operate efficiently, the thermally responsive element of the damper must have an adequate response time so that the vent damper moves to a closed position shortly after combustion ceases in order to prevent unnecessary heat loss. Similarly, the thermally responsive element should possess an equally prompt response time so that the vent damper moves to an open position within an adequate time frame after combustion has commenced in order to allow the gases resulting from combustion to properly access the flue.

Many of these thermally responsive elements are made from a bimetallic material consisting of two metals each having different coefficients of expansion. Upon exposure to a sufficient increase in temperature, these metals expand at differing rates causing the thermally responsive element to undergo some sort of flexion or shape alteration. It is known that the direction, degree and rate of alteration or flexion is a function of the original shape of the thermally responsive element, the gauge of the materials used and the type of materials as well as their respective quantities.

Typically, the bimetallic elements used in vent dampers are subject to damage due to overheating as well as the extreme changes in temperature in which they must operate repeatedly over a number of years. It is known that this damage often occurs in the form of metal fatigue due to stresses placed on the thermally responsive elements during extended high temperature exposure. In fact, the damper assemblies disclosed in U.S. Pat. No. 4,386,731 to Barth and U.S. Pat. No. 4,460,121 to Hedrick are directed to relieving some of the stresses which thermally responsive elements experience during operation.

Metal fatigue is an extremely dangerous problem in thermally activated vent dampers as it may ultimately lead to the breakage of the thermally activated element due to the existing weight of the damper member or forces exerted during normal flue cleaning or maintenance operations. To compound the problem, these vent dampers are concealed from view and are difficult to inspect. One of the major shortcomings of thermally activated vent dampers utilizing a bimetallic spring or other thermally activated biasing elements is their lack of a fail-safe configuration. Upon breakage of the thermally responsive element, the flue damper will remain in a closed position unless acted upon manually. Consequently, combustion gases will be prevented from properly accessing the flue portion of the heating apparatus, creating an extremely hazardous situation.

Some thermally activated vent dampers use a very simplistic design having a bimetallic flap as a damping means. Typically, one end of the flap is secured in position against the flue or a support member while the other end is free to undergo movement. At ambient temperatures, the flap remains closed usually resting on a stop member positioned somewhere in the flue. Upon exposure to elevated temperatures, the free end of the bimetallic flap undergoes flexion and moves into a position which allows the gases resulting from combustion to properly access the flue. Upon cessation of combustion, the bimetallic flap returns to a closed position. One of the drawbacks of this type of arrangement is a poor response time due to the amount of heat build up necessary to induce a response in the larger surface area and thickness of the flap relative to other types of thermally activated vent dampers which typically have a better response time because they employ bimetallic coils or springs to move a solid damper member.

Another well known problem in vent damper assemblies, generally, involves friction occurring at points where moving parts operatively contact other structures. One source of such friction is the creation and deposition of residual particulate matter such as creosote which occurs as a by-product of the combustion of certain carbon-containing fuels. These deposits, some of which are extremely tar-like in consistency, tend to accumulate on the vent damper assembly as well as the flue walls inhibiting operative movements. An additional source of friction stems from the deterioration of the metal components within the vent damper assembly. Despite the use of corrosive resistant metals such as stainless steel or aluminized metals, high temperature operating conditions in conjunction with the corrosive properties of the flue gas ultimately lead to microscopic as well as macroscopic surface deformations including pits, fissures and depressions which increase the coefficient of friction and consequently inhibit movement.

It is well known in the art that the expansive properties of the metals themselves can also contribute to friction. As previously mentioned, repeated exposure to extreme changes in temperature over the years can result in metal fatigue and deformation. When these phenomena occur, stress points can develop in the vent damper assembly at sites where moving parts contact other structures despite efforts in design calculations and measurements to accommodate these changes. These stresses become magnified as the metal components of the vent damper assembly undergo normal expansion upon exposure to the elevated temperatures associated with combustion. The result is a dramatic increase in the coefficient of friction which consequently inhibits movement.

Increased friction in a thermally activated vent damper assembly is detrimental as it interferes with adequate response times. It is common knowledge in the art that any vent damper assembly possessing numerous moving parts has a greater potential for frictional inhibition of proper operation merely due an increased number of sites where moving parts contact other structures. Most thermally activated vent damper assemblies to date have damper members which are suspended in some fashion from a support member. Typically, the support member either rotates within the flue thereby rotating the damper member or alternatively the damper member rotates around the support member utilizing some hinge-type mechanism. Either approach creates a potential site for increased friction due to residual particulate accumulations or structural deformations.

OBJECTS AND SUMMARY OF THE INVENTION

It is an object of the present invention to provide a thermally activated vent damper assembly which utilizes a thermally activated biasing means such as a bimetallic spring and which possesses an adequate response time in conjunction with a novel fail-safe configuration whereby the damper member defaults to or remains in an open position upon breakage or failure of the thermally responsive element.

It is a further object of the present invention to provide a simplistic vent damper assembly design having an adequately prompt response time in conjunction with a minimal number of moving parts, thereby reducing potential sites for friction.

In accordance with these and other objects of the invention, a thermally activated vent damper assembly is provided which includes a damper member, a support member and a thermally activated biasing member. The damper member can be situated either within the flue or at the intersection of the flue proper and the combustion chamber, as long as the damper remains in a position which provides for the occlusion of the passage of gas through the flue. If the damper member is positioned within the flue, its dimensions and shape will be determined by the cross-sectional area of the flue. If the damper member is located at the intersection of the combustion chamber and the flue, then the dimensions and shape of the damper member can vary as long as the shape and dimensions chosen allow for proper occlusion of the flue.

The support member traverses the flue space horizontally within the flue or at the intersection of the flue and the combustion chamber and is arranged to suspend the damper member horizontally across the flue. The damper member moves about the stationary support member between an open and closed position. In the open position, the damper member is aligned in a vertical orientation below the support member, parallel to the passage of flue gas. In the closed position, the damper member is aligned in a horizontal orientation approximately level with the support member, perpendicular to the passage of flue gas.

The support member is connected to a thermally activated biasing member, such as a bimetallic spring or coil, which is in turn connected to the damper member. These connections can be achieved using spot welding or other means for securing as known in the art. Alternatively, the support member can include two bracket members positioned and affixed to one another so as to capture one end of the biasing member between them thereby securing the biasing member without the need for spot welding or other securing means.

In the absence of heat, the biasing member will exert a force on the damper member to bias the damper member in a closed position. Upon exposure to heat, the biasing member activates, applying a force to bias the damper member in the open position. If the bias is removed from the damper member, it will remain in or default to an open position under the force of gravity despite the damper member position prior to the removal of bias. This configuration allows for a unique safety feature whereby the flue remains open upon a breakage or failure of the biasing member to apply a bias.

In addition, the present vent damper assembly configuration provides a simplistic design whereby the damper member moves about the support member without the use of hinges or other pivot points. The damper member of the present invention is suspended by the stationary support member only through means of the biasing member, thus eliminating potential sites for friction which may interfere with response time.

For a better understanding of the present invention, together with other and further objects, reference is made to the following description, taken together with the accompanying drawings, and its scope will be pointed out in the appended claims.

DETAILED DESCRIPTION OF THE PREFERRED EMBODIMENT

Figure 1:
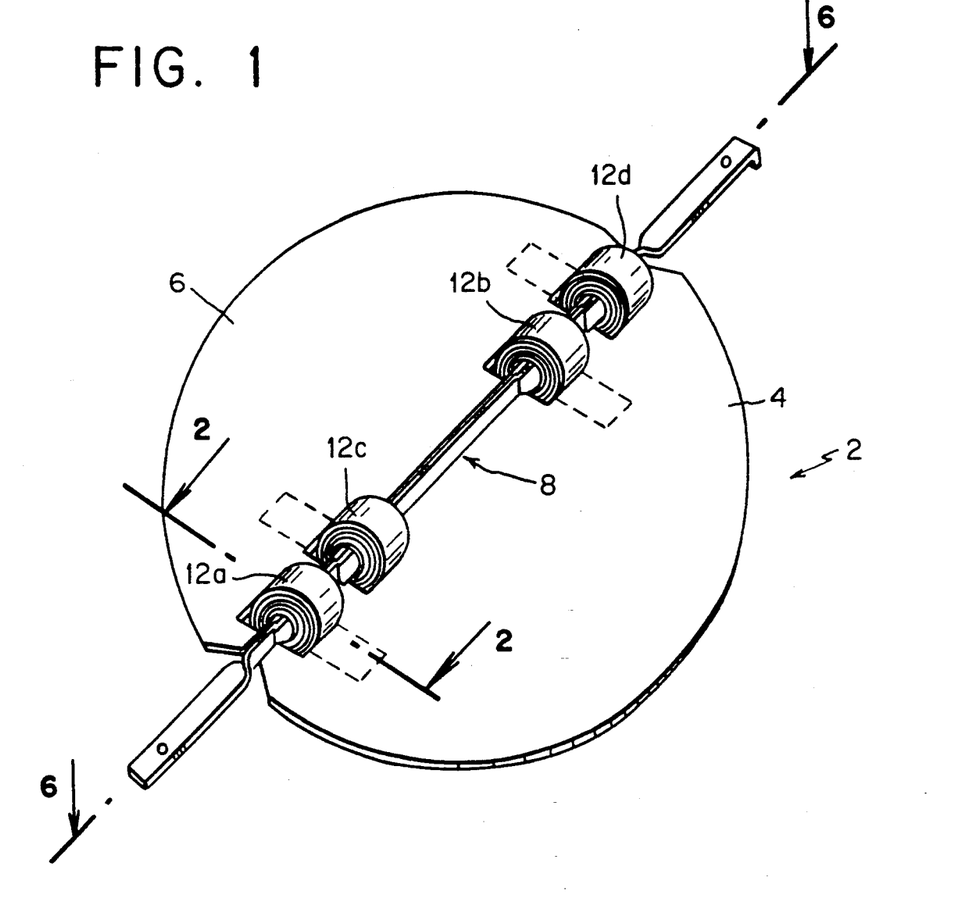
FIG. 1 is a perspective view of the assembled thermally activated vent damper assembly according to the preferred embodiment of the present invention.

Initially referring to FIGS. 1-7, a thermally activated vent damper assembly 2 constructed in accordance with the present invention includes a damper member, preferably consisting of a first damper blade 4 and a second damper blade 6, arranged with respect to a flue 70 and suspended across the flue by a support member 8. The damper blades 4 and 6 are preferably mounted on opposite sides of the support member 8 and operatively coupled to the support member by thermally activated biasing members 12a, 12b, 12c and 12d mounted concentrically about the support member as illustrated in FIG. 1.

Figure 3:
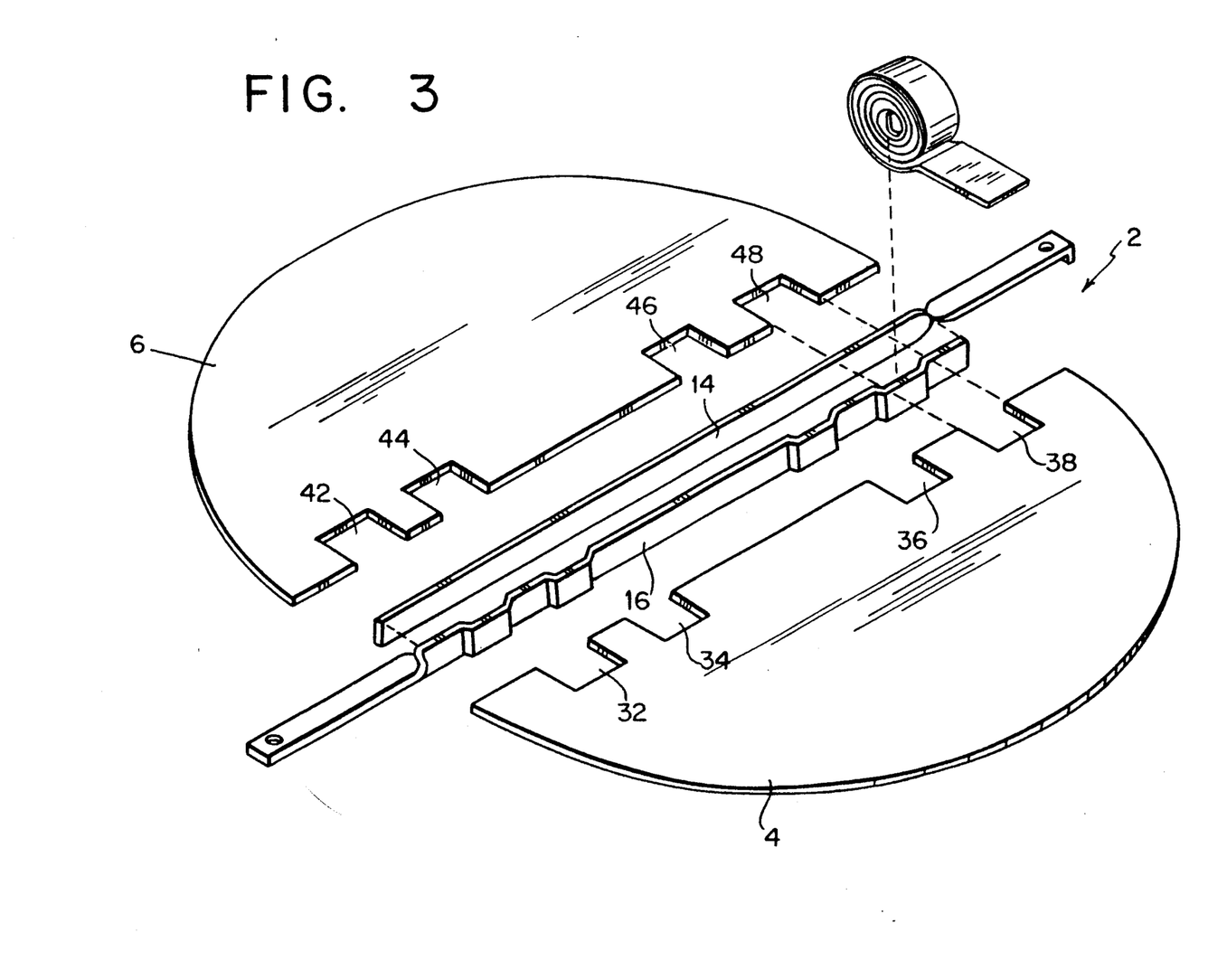
FIG. 3 is an exploded view of the vent damper assembly as illustrated in FIG. 1.

In the preferred embodiment of the vent damper assembly 2 as shown in FIG. 3, damper blade 4 includes an inner edge facing the bracket member 16 in which notches 32, 34, 36 and 38 are formed. Similarly, damper blade 6 includes an inner edge facing the bracket member 14 in which notches 42, 44, 46 and 48 are formed as shown in FIG. 3. Notches 32, 34, 36 and 38 and notches 42, 44, 46 and 48 can be either cut or stamped into the respective damper blades 4 and 6 by any method known in the art or alternatively the damper blades can be originally cast to include the notches. Notches 32 and 42 should be of a shape and dimension to receive the thickness and width of biasing member 12a while notches 36 and 46 should be of a shape and dimension to receive the thickness and width of biasing member 12b. Similarly, notches 34 and 44 should be of a shape and dimension to receive the thickness and width of biasing member 12c and notches 38 and 48 should be of a shape and dimension to receive the thickness and width of biasing member 12d.

If an alternative number of biasing members are contemplated, the number of notches in each damper blade should accordingly correspond to the number of biasing members. Additionally, damper blades 4 and 6 should be preferably manufactured from either stainless steel or aluminized metal for improved resistance to the corrosive properties of hot flue gas.

Figure 7:
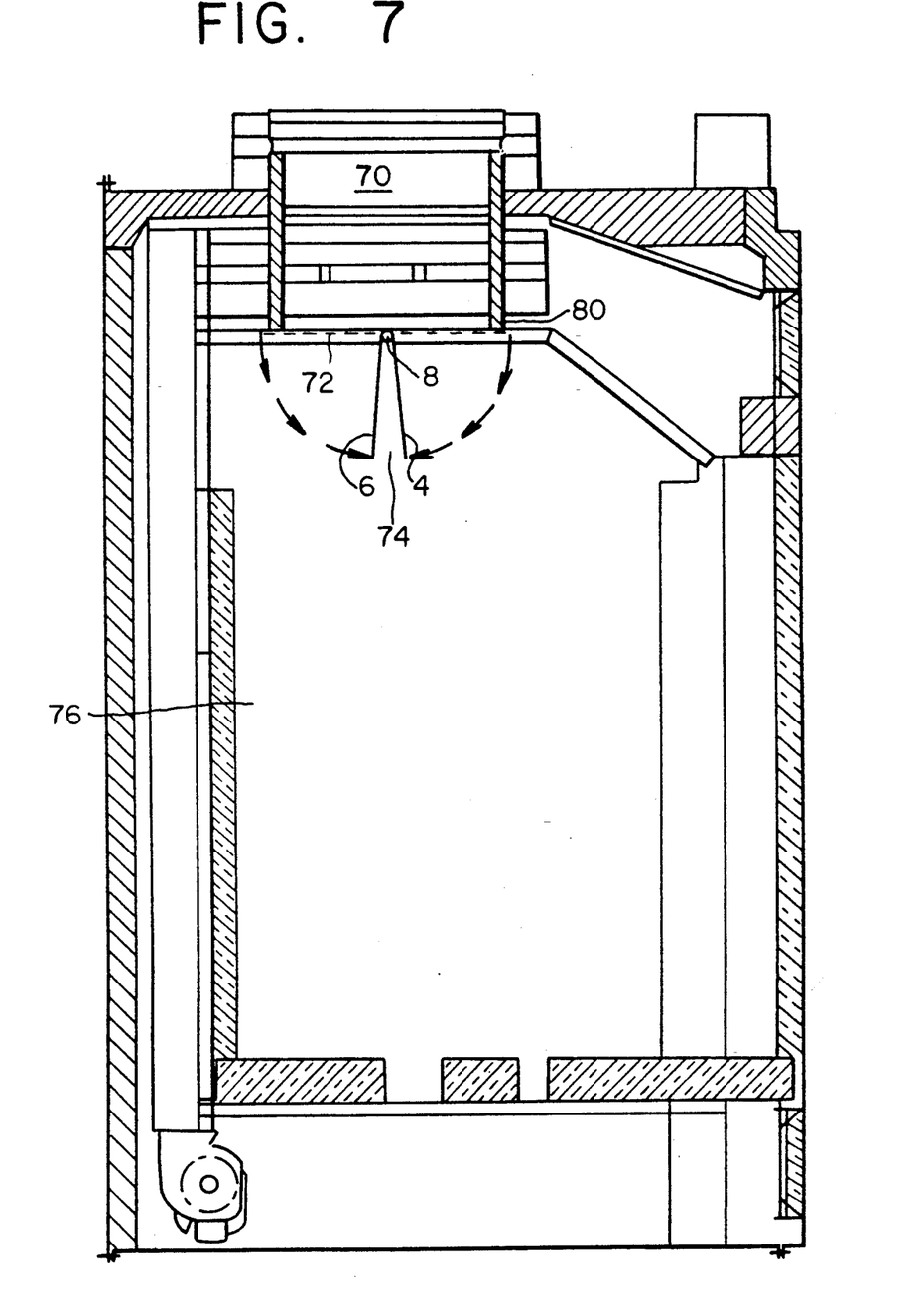
FIG. 7 illustrates the vent damper assembly of FIG. 1 as situated at the intersection of a flue and a combustion chamber to illustrate the closed and opened position of the damper member.

The biasing members 12a–12d bias the damper blades 4 and 6 in the open position 74 in the presence of heat from the combustion chamber 76 and also bias the damper blades in the closed position 72 in the absence of heat. The biasing members 12a–12d are coupled between the support member 8 and the damper members 4 and 6 rendering the damper blades movable under the force of gravity upon the removal of bias by the biasing members.

Upon the removal of bias by the biasing members 12a–12d due to breakage or other failure of the biasing members to apply bias, the damper blades 4 and 6 will move about the support member 8 from the closed position 72 to the open position 74 under the force of gravity providing for the free passage of flue gases up the flue. If the removal of bias by the biasing members 12a–12d occurs when the damper blades 4 and 6 are in the open position 74, then the damper blades will of course remain in the open position under the force of gravity providing for the free passage of flue gas up the flue. Similarly, if the removal of bias by the biasing members 12a–12d occurs when the damper blades 4 and 6 are in any position between the closed position 72 and the open position 74, the damper blades will move to the open position under the force of gravity providing for free passage of flue gases up the flue.

As illustrated in FIG. 7, the damper assembly 2 is situated at the intersection of the flue 70 and the combustion chamber 76, although the support member 8 can be easily modified by methods known in the art to accommodate an alternative placement of the damper assembly within the flue. If the damper blades 4 and 6 are positioned within the flue 70, their dimensions and shape should approximate the cross-sectional area of the flue.

If the damper blades 4 and 6 are located at the intersection of the combustion chamber 76 and the flue 70, as illustrated in FIG. 7, then the dimensions and shape of the damper blades may vary as long as proper occlusion of the flue is achieved. Regardless of the positioning of the vent damper assembly 2, damper blades 4 and 6 are preferably mirror images of one another to provide for an even distribution of weight about the support member 8, although this configuration is not mandatory.

In the embodiment illustrated herein, it is contemplated that the support member 8 includes a first bracket member 14 and a second bracket member 16. However, the support member may consist of any suitable single structure known in the art for suspending the damper blades 4 and 6 across the flue 70 as long as such a structure provides for a site of attachment for the biasing members 12a–12d. The support member 8 preferably traverses the center of the flue 70 although it is possible to have the support member traverse the flue just proximal to the flue wall 80 in a situation where the damper blades 4 and 6 are alternatively replaced by a single damper blade mounted on a single support member.

Figure 2:
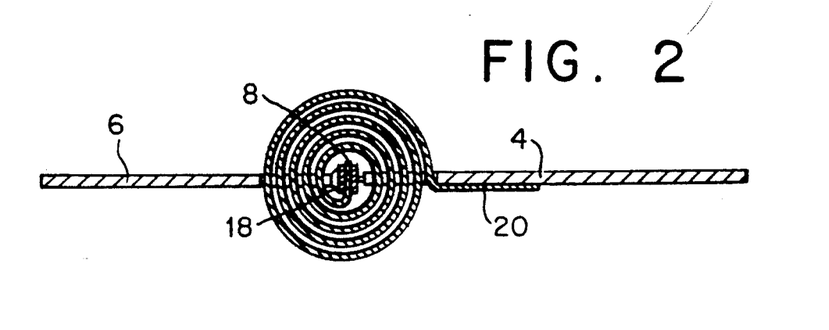
FIG. 2 is a cross-sectional view of the vent damper assembly illustrated in FIG. 1 taken along line 2—2.

As shown in FIGS. 1 and 2, damper blades 4 and 6 are coupled to the support member 8 by way of the biasing members 12a–12d. In particular, damper blade 4 is coupled to the support member 8 by way of biasing members 12a and 12b while damper blade 6 is coupled to the support member by biasing members 12c and 12d. This manner of coupling avoids unnecessary friction as there is no need for additional moving parts such as hinges or damper members supported on a pivotal axis, as for example in an arrangement where a damper member is supported by pins mounted in the flue wall.

In a preferred embodiment of the invention, the biasing members 12a, 12b, 12c and 12d are bimetallic springs as illustrated in FIGS. 1 and 2. However, other suitable coiled biasing members known in the art would be acceptable. The biasing members 12a–12d should preferably be constructed of material having an ASTM TM-1 rating. The biasing members 12a–12d are arranged concentrically about the support member 8. Each of the biasing members 12a–12d has a first innermost end 18 that is secured to the support member 8 and a second outermost end 20 that is secured to one of either of the damper blades 4 or 6. The respective couplings between the innermost end 18 of each of the biasing members 12a–12d to the support member 8 and the outermost end 20 of each of the biasing members to either of the damper blades 4 or 6 can be achieved by spot welding or any other methods of securing known in the art.

Figure 4A:
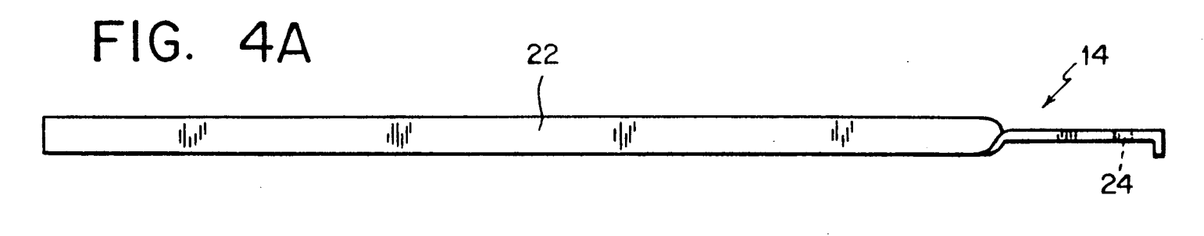
FIG. 4A is a top view of the first bracket member component of the support member as shown in FIG. 1.
Figure 4B:
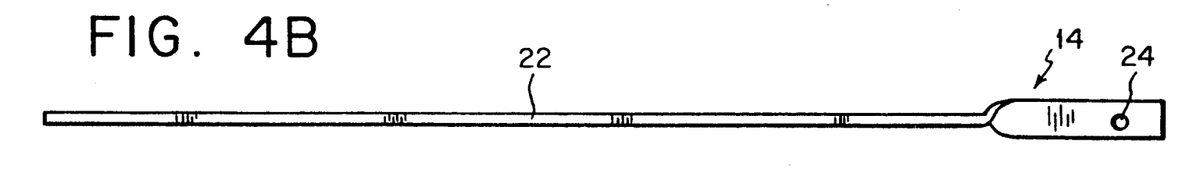
FIG. 4B is a side view of the first bracket member component of the support member as shown in FIG. 1.
Figure 5A:
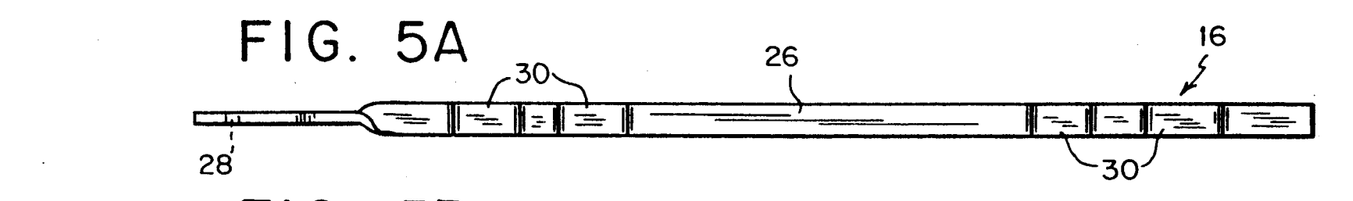
FIG. 5A is a top view of the second bracket member component of the support member as shown in FIG. 1.
Figure 5B:
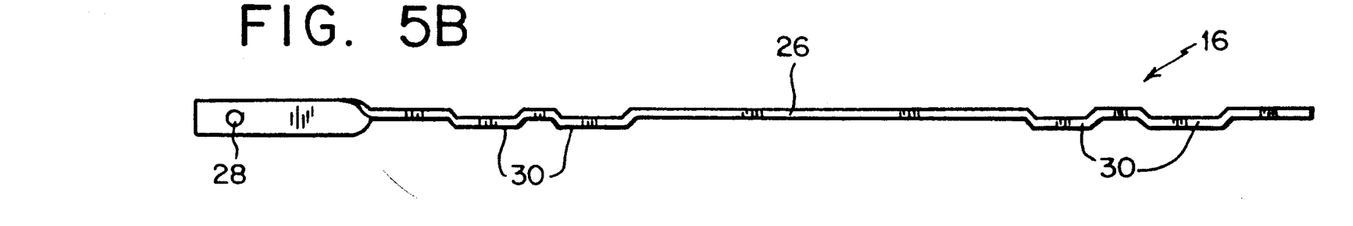
FIG. 5B is a side view of the second bracket member component of the support member as shown in FIG. 1.
Figure 6:
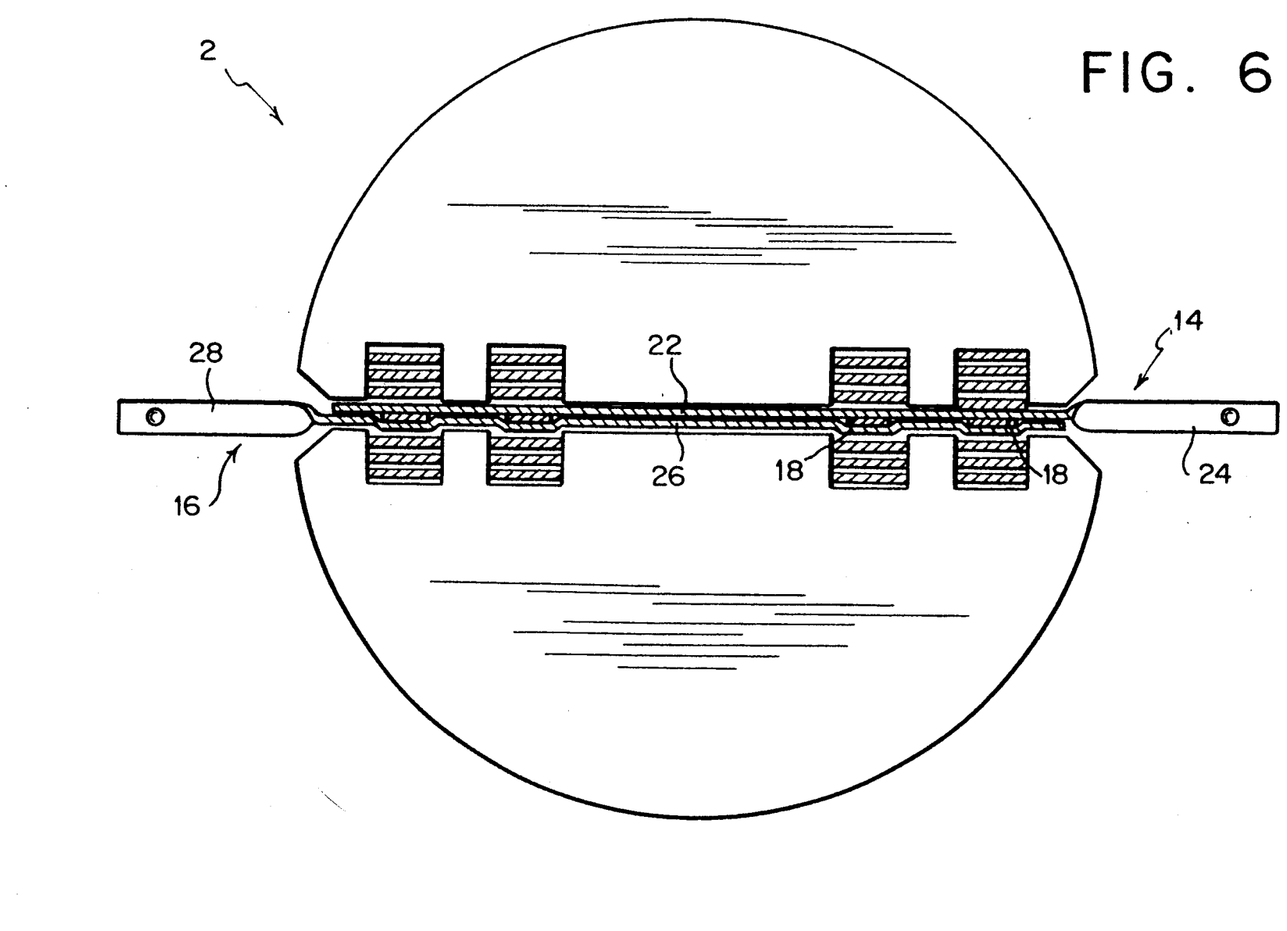
FIG. 6 is a cross-sectional view taken along line 6—6 of the vent damper assembly shown in FIG. 1 illustrating the innermost end of the biasing member as captured between the first and second bracket component.

In a preferred form of the invention, the support member 8 is manufactured from either stainless steel or aluminized metal and includes a first bracket member 14 and a second bracket member 16. As illustrated in FIGS. 4A and 4B, bracket member 14 includes an elongated facial portion 22 and an end portion 24. Bracket member 16 includes an end portion 28 and an elongated facial portion 26 having a series of recesses 30 as illustrated in FIGS. 5A and 5B. The elongated facial portion 22 of the bracket member 14 is ultimately joined in a side-by-side relationship with the elongated facial portion 26 of bracket member 16 as illustrated in FIG. 6. Prior to joining bracket members 14 and 16 to one another, the innermost end 18 of each of the biasing members 12a–12d is aligned within one of the recesses 30 located in the facial portion 26 of bracket member 16 as shown in FIG. 6. Accordingly, the number of recesses 30 in bracket member 16 should correspond with the number of biasing members 12a–12d present in the vent damper assembly 2 while the shape and dimension of each of the recesses should be such as to at least partially accommodate the width and the gauge of the innermost end 18 of one of the biasing members. Once the innermost end 18 of each of the biasing members 12a–12d is aligned within one of the recesses 30 to which it corresponds, the bracket members 14 and 16 are affixed to one another at their respective facial portions 22 and 26 by spot welding or other means for securing known in the art.

In an alternative embodiment, the bracket member 16 lacks the recesses 30 along the elongated facial portion 26 within which to align the innermost end 18 of each of the biasing members 12a–12d. In such a situation, spot welding or some additional means of securing the innermost end 18 of each of the biasing members 12a–12d must be employed to secure it between bracket members 14 and 16. Similarly, if the support member 8 alternatively consists of a single support bracket, a means of securing the biasing members 12a-12d to the support member must be employed.

FIGS. 4A and 4B illustrate bracket member 14 having elongated facial portion 22 residing in a plane that is perpendicular with respect to a plane within which the end portion 24 resides. FIGS. 5A and 5B illustrate bracket member 16 having the elongated facial portion 26 residing in a plane that is perpendicular to the plane within which the end portion 28 resides. The end portions 24 and 28 are oriented perpendicularly to respective facial portions 22 and 26 to provide for ease in mounting the vent damper assembly 2 at the intersection of the flue 70 and the combustion chamber 76. It should be noted that facial portions 22 and 26 approximate one another in shape and dimension with the exception of the recesses 30 located within facial portion 26. This similarity in symmetry provides for the complementary affixation of the facial portion 22 of bracket member 14 to the facial portion 26 of the bracket member 16 as shown in FIG. 3. The complementary affixation of bracket member 14 to bracket member 16 should be accomplished with the recesses 30 occurring on the facial portion 26 of bracket member 16 facing the facial portion 22 of bracket member 14. The end portion 24 and the end portion 28 should be positioned opposite each other as illustrated in FIG. 3.

As heat from the combustion chamber 76 contacts the biasing members 12a-12d, the biasing members undergo movement as a result of the thermal expansion properties of the metals which they contain. As the biasing members expand, they move applying a bias to the damper blades 4 and 6, moving the damper blades about the support member 8 without the need for hinges or pivot points which are subject to frictional forces that inhibit response time. Consequently, the damper blades are effectively moved from the closed position 72, where they occlude the flue, to an open position 74 as shown in FIG. 7. When heat is removed, the biasing members contract and bias the damper blades to the closed position. If the biasing members break or malfunction such that they fail to apply bias to the damper blades, the configuration of the present vent damper assembly provides for the damper blades to hang down in the open position 74 under the force of gravity. If the failure of the biasing members occurs during cooled conditions, as would be the case where there is no combustion and the damper blades are in the closed position 72, then the damper blades will fall under the force of gravity to the open position 74. If similar failure occurs during the elevated temperatures of combustion where the damper blades are already in the open position, the damper blades will remain in the open position after combustion ceases and any residual heat is dissipated.

In this manner, the vent damper assembly of the present invention provides for a fail-safe configuration to function as a unique safety feature for automatic, thermally activated vent damper assemblies. In addition, the simplistic design of the present vent damper assembly promotes a better response time by eliminating sites for the frictional inhibition of damper member movement, especially after extended use over a number of years.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A thermally activated vent damper assembly for a flue, comprising:
   a) a damper member adapted to be situated in relation to the flue for occluding the passage of gas through the flue;
   b) at least one support member which is adapted to traverse the flue and to suspend the damper member across the flue for movement between a closed first position and an open second position with respect to passage of gas through the flue, the closed first position occluding the passage of gas through the flue and the open second position providing for free passage of gas through the flue and wherein the support member includes a first and a second bracket member, each of the first and second bracket members having an elongated facial portion joined together in a side-by-side relationship; and
   c) a thermally activated coil member arranged concentrically about the support member, the coil member having an innermost end and an outermost end, the innermost end of the coil member being coupled to the support member, interposed between the first and second bracket member and secured thereby and the outermost end being coupled to the damper member.

2. The thermally activated vent damper assembly of claim 1, wherein the elongated facial portion of at least one of the first and second bracket members has a recess formed therein to at least partially receive the innermost end of the coil member.

3. A thermally activated vent damper assembly for a flue, comprising:
   a) a damper member adapted to be situated in relation to the flue for occluding the passage of gas through the flue;
   b) at least one support member which is adapted to traverse the flue and to suspend the damper member across the flue for movement between a closed first position and an open second position with respect to passage of gas through the flue, the closed first position occluding the passage of gas through the flue and the open second position providing for free passage of gas through the flue and wherein the support member includes at least one bracket member having an elongated facial portion and an end portion, the elongated facial portion residing in a plane that is perpendicular to a plane within which the end portion resides; and
   c) a thermally activated biasing member operatively coupled between the support member and the damper member to bias the damper member in the open second position in the presence of heat and to bias the damper member in the closed first position in the absence of heat, the operative coupling of the biasing member to the support member and to the damper member being such that the bias of the biasing member on the damper member is removed upon a breakage of the biasing member, the damper member being movable under the force of gravity from the closed first position to the open second position upon the removal of bias by the biasing member.

4. A thermally activated vent damper assembly for a flue, comprising:
   a) a first and a second damper blade adapted to be situated in relation to a flue for occluding the passage of gas through the flue and wherein each of the first and second damper blades includes at least one notch formed through the thickness thereof;
   b) a support member which is adapted to traverse the flue and to suspend the first and second damper blades across the flue on opposite sides of the support member for movement between a closed first position and an open second position with respect to the passage of gas through the flue, the closed first position occluding the passage of gas through the flue and the open second position providing for free passage of gas through the flue, the support member including a first and a second bracket member, each of the first and second bracket members having an elongated facial portion and an end portion, the elongated facial portion of the first bracket member being joined in a side-by-side relationship with the elongated facial portion of the second bracket member, at least one of the first and second bracket members having a recess formed in the elongated facial portion thereof, the first bracket member having the elongated facial portion thereof residing in a plane that is perpendicular with respect to a plane within which the end portion thereof resides, and the second bracket member having the elongated facial portion thereof residing in a plane that is perpendicular with respect to a plane within which the end portion thereof resides; and
   c) at least a first and a second thermally activated bimetallic spring, each spring being arranged concentrically about the support member and each spring having an innermost end and an outermost end, the innermost end of each spring being operatively coupled to the support member wherein the innermost end of each spring is interposed between the first and second bracket members and secured thereby within the recess formed within at least one of the first and second bracket members, and the outermost end of each of the first and second springs being operatively coupled to the first and second damper blades, respectively and respectively received by the notch formed through the thickness of each of the first and second damper blades to bias each of the first and second damper blades in the open second position in the presence of heat and to bias each of the first and second damper blades in the closed first position in the absence of heat, the operative coupling of the first spring to the support member and to the first damper blade being such that the bias of the first spring on the first damper blade is removed upon a breakage of the first spring, the first damper blade being movable under the force of gravity from the closed first position to the open second position upon the removal of bias by the first spring and wherein the operative coupling of the second spring to the support member and to the second damper blade being such that the bias of the second spring on the second damper blade is removed upon a breakage of the second spring, the second damper blade being movable under the force of gravity from the closed first position to the open second position upon the removal of bias by the second spring.

5. The thermally activated vent damper assembly of claim 12, wherein the first and the second damper blades are arranged in a fail-safe configuration whereby the first damper blade defaults to the open second position upon the breakage of the first bimetallic spring and the first damper blade also remains in the open second position upon the breakage of the first bimetallic spring and whereby the second damper blade defaults to the open second position upon the breakage of the second bimetallic spring and the second damper blade also remains in the open second position upon the breakage of the second bimetallic spring.

* * * * *

UNITED STATES PATENT AND TRADEMARK OFFICE
CERTIFICATE OF CORRECTION

PATENT NO. : 5,082,172

DATED : January 21, 1992

INVENTOR(S) : Karabin, et. al.

It is certified that error appears in the above-indentified patent and that said Letters Patent is hereby corrected as shown below:

Column 10, line 30, delete "12" and insert therefor --4--.

Signed and Sealed this

Fifteenth Day of June, 1993

Attest:

MICHAEL K. KIRK

Attesting Officer     Acting Commissioner of Patents and Trademarks